United States Patent
Elvesjö et al.

(10) Patent No.: US 11,042,205 B2
(45) Date of Patent: Jun. 22, 2021

(54) INTELLIGENT USER MODE SELECTION IN AN EYE-TRACKING SYSTEM

(71) Applicant: Tobii AB, Danderyd (SE)

(72) Inventors: John Mikael Elvesjö, Danderyd (SE); Anders Kingbäck, Danderyd (SE); Gunnar Troili, Danderyd (SE); Mårten Skogö, Danderyd (SE); Henrik Eskilsson, Danderyd (SE); Peter Blixt, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 15/785,039

(22) Filed: Oct. 16, 2017

(65) Prior Publication Data

US 2018/0239412 A1    Aug. 23, 2018

Related U.S. Application Data

(63) Continuation of application No. 14/354,903, filed as application No. PCT/EP2012/071231 on Oct. 26, 2012, now Pat. No. 9,791,912.

(Continued)

(30) Foreign Application Priority Data

Oct. 27, 2011    (EP) ..................................... 1186882

(51) Int. Cl.
*G06F 1/3231* (2019.01)
*G06F 1/3287* (2019.01)
(Continued)

(52) U.S. Cl.
CPC .......... *G06F 1/3231* (2013.01); *G06F 1/3265* (2013.01); *G06F 1/3287* (2013.01);
(Continued)

(58) Field of Classification Search
CPC .... G06F 3/3231; G06F 3/3265; G06F 3/3287; G06F 3/013; G06K 9/00221; Y02D 10/171
See application file for complete search history.

(56) References Cited

U.S. PATENT DOCUMENTS

| 5,835,083 | A | 11/1998 | Nielsen et al. |
| 6,152,563 | A | 11/2000 | Hutchinson et al. |

(Continued)

FOREIGN PATENT DOCUMENTS

| EP | 2587341 A1 | 5/2013 |
| JP | 09198508 A * | 1/1996 |

(Continued)

OTHER PUBLICATIONS

Guestrin, et al.; "General Theory of Remote Gaze Estimation Using the Pupil Center and Corneal Reflections"; *IEEE Transactions on Biomedical Engineering*, vol. 53, No. 6, Jun. 2006; pp. 1124-1133.

*Primary Examiner* — Sahlu Okebato
(74) *Attorney, Agent, or Firm* — Samuel Yamron

(57) ABSTRACT

A personal computer system comprises a visual display, an imaging device adapted to provide eye-tracking data by imaging at least one eye of a viewer of the visual display, and identifying means for recognizing the viewer with reference to one of a plurality of predefined personal profiles. The personal computer system further comprises an eye-tracking processor for processing the eye-tracking data. According to the invention, the eye-tracking processor is selectively operable in one of a plurality of personalized active sub-modes associated with said personal profiles. The sub-modes may differ with regard to eye-tracking related or power-management related settings. Further, the identifying means may sense an identified viewer's actual viewing condition (e.g., use of viewing aids or wearing of garments), (Continued)

wherein the imaging device is further operable in a sub-profile mode associated with the determined actual viewing condition.

20 Claims, 3 Drawing Sheets

Related U.S. Application Data

(60) Provisional application No. 61/596,517, filed on Feb. 8, 2012.

(51) Int. Cl.
*G06F 3/01* (2006.01)
*G06F 1/3234* (2019.01)
*G06K 9/00* (2006.01)

(52) U.S. Cl.
CPC ......... *G06F 3/013* (2013.01); *G06K 9/00221* (2013.01); *Y02D 10/00* (2018.01)

(56) References Cited

U.S. PATENT DOCUMENTS

| | | |
|---|---|---|
| 7,572,008 B2 | 8/2009 | Elvesjo et al. |
| 7,657,062 B2 | 2/2010 | Pilu |
| 9,791,912 B2 | 10/2017 | Elvesjo et al. |
| 2005/0199783 A1 | 9/2005 | Wenstrand et al. |
| 2005/0225723 A1* | 10/2005 | Pilu .................. A61B 3/113 351/209 |
| 2009/0179853 A1 | 7/2009 | Beale |
| 2010/0066975 A1 | 3/2010 | Rehnstrom |
| 2010/0079508 A1 | 4/2010 | Hodge et al. |
| 2010/0205667 A1 | 8/2010 | Anderson et al. |
| 2010/0262281 A1 | 10/2010 | Suzuki et al. |
| 2011/0051239 A1 | 3/2011 | Daiku |
| 2011/0270123 A1* | 11/2011 | Reiner ................. A61B 3/113 600/558 |

FOREIGN PATENT DOCUMENTS

| | | |
|---|---|---|
| WO | 2008/056274 A1 | 5/2008 |
| WO | 2009/022924 A1 | 2/2009 |

* cited by examiner

INTELLIGENT USER MODE SELECTION IN AN EYE-TRACKING SYSTEM

CROSS REFERENCE TO RELATED APPLICATIONS

This application is a continuation of U.S. Pat. No. 9,791,912, filed Apr. 28, 2014, which is a national stage of PCT App. No. PCT/EP2012/071231, filed Oct. 26, 2012, which claims the benefit of U.S. Prov. Pat. App. No. 61/596,517, filed Feb. 8, 2012, and EPO Pat. App. No. 11186882.4, filed Oct. 27, 2011. The entire disclosures of all of the above documents are hereby incorporated by reference, for all purposes, as if fully set forth herein.

TECHNICAL FIELD

The invention disclosed herein generally relates to eye tracking (determination of eye position, gaze point or gaze angle) for providing input data to a computer system. In particular, the invention provides an energy-efficient implementation of eye tracking assisted by an artificial light source adapted to determine the gaze point of an eye watching a visual display forming part of a portable or stationary personal computer system, a TV, a heads-up display in a vehicle, a near-eye display or a display in a communication device with imaging and computing capabilities, such as a mobile telephone.

BACKGROUND

Monitoring or tracking eye movements and detecting a person's gaze point can be used in many different contexts. Eye tracking data can be an important information source in analysing the behaviour or consciousness of the person. It can be used both for evaluating the object at which the person is looking and for evaluating the respective person. The diverse uses of gaze point detection include studies on the usability of software and different types of interfaces; evaluation of web pages, advertising and advertisements; provision of means for educating pilots in simulator environments and for training surveillance personnel in security-critical roles; and research in psychology, behavioural sciences and human perception. A field which has attracted an increasing interest in recent years is the evaluation of advertising and other marketing channels.

Eye-tracking techniques can also be used in a human-machine interface (HMI): a user can control a computer by just looking at it. Such eye control can be applied as sole interaction technique or combined with keyboard, mouse, physical buttons and voice. Eye control is used in communication devices for disabled persons and in various industrial and medical applications.

While eye-tracking systems are utilized in a growing range of applications aimed at professionals, they are rarely included as standard peripherals in or as integral parts of new laptops, desktops, smart phones and other personal computer systems. In the case of battery-powered systems, concerns that eye-tracking functionalities might impair an otherwise optimized energy management may be one reason for this absence.

US 2005/199783 A1 describes a technique for switching a generic device between a power-up state, a sleep state and a power-off state on the basis of eye detection data relating to a user. Only the presence or absence of an eye is of concern, not the gaze angle. A detected presence of an eye causes switching from the sleep state to the power-up state, while a detected absence causes switching down from the power-up state to the sleep state, and then to the power-off state of the device. While this document describes how an eye detection result, namely eye presence, can be used to improve the energy performance of the generic device, it does not address the power management problem in the eye detection equipment itself. Nor does it propose any solution that is tailored to, and benefits from, the particularities associated with eye detection activity.

Similarly, U.S. Pat. No. 5,835,083 A and WO 2008/056274 A1 discuss how gaze-point measurements can be used to control a power state of a visual display, so that power consumption is reduced when a user's eyes and hence a user's attention are not directed to the device. They also do not address power management in the eye tracker itself.

US 2010/079508 A1 discloses an electronic device with a display, such as a handheld computer, which is able to detect whether a user's gaze is directed towards the display. The device implements a power management scheme which involves the device operating in multiple modes to conserve power and utilizing gaze detection operations to assist in determining an appropriate mode in which to operate. The different modes of the device involve adjusting the brightness of the display or turning on/off components such as a display or a touch screen in order to conserve power. Additionally, certain aspects of the gaze detection capabilities of the device can be adjusted to conserve power depending on the mode in which the device is operating.

A further possible reason that eye-tracking functionalities are not yet included as standard components in personal computer systems is the hassle that may arise in connection with transitions between different users. Eye-tracking systems that attempt to offer some relief in this respect have emerged, e.g., the one disclosed in U.S. Pat. No. 7,657,062 B2, which is configured to match an estimated time distribution of the azimuth gaze direction against a predetermined distribution of the same quantity measured under laboratory conditions. The gaze direction is either measured with respect to a fixed coordinate system or to a system fixed about a human head.

SUMMARY

In view of the above concerns, it is an object of the present invention to propose a personal computer system with improved power management functionalities in respect of eye-tracking equipment included therein. It is a particular object to improve power management in a system of this type while preserving low latency in respect of user interactions at all instants when the device is operating. Yet another object is to provide an eye-tracking system that can be integrated in a personal computer system (e.g., desktop or laptop computer, tablet computer, notebook, net book, TV, smart phone, personal digital assistant, digital camera, heads-up display, near-eye display) without burdening the energy performance of the computer system. A further object is to facilitate the use of one eye-tracking enabled personal computer system by many users. In such a system, it is a particular desire to simplify and accelerate the transitions between different viewers and/or decrease the risk of human errors in connection with the transitions.

At least one of these objects is achieved by a method, computer program product, and personal computer system, as set forth in the independent claims. The dependent claims define embodiments of the invention.

A personal computer system includes a visual display, an imaging device for providing eye-tracking data by imaging a portion of the face (preferably including at least one eye) of a viewer of the visual display, and further one or more input means for accepting eye-tracking control data and other input data. The imaging device may include a camera and an optional light source for illuminating an eye in an on-axis or off-axis fashion, or for producing at least one corneal reflection (or glint, or first Purkinje reflection) to facilitate eye tracking. Such illumination which the imaging device provides in addition to natural or background light sources will be referred to as active illumination. The other input data may include pointing device signals, keyboard characters, keyboard combinations, visual data other than eye-tracking data, proximity sensing, data acquired by an acoustic transducer and the like.

According to a first aspect of the invention, the imaging device is operable in at least an active mode, a ready mode and an idle mode. In the active mode, the imaging device is fully operable as regards accuracy, detection range and other performance parameters that may influence the momentary power consumption of the device. The ready mode and the idle mode represent power-saving alternatives to the active mode, which differ at least with respect to their respective wake-up times. More precisely, the wake-up time required to switch from ready mode into active mode is shorter than the wake-up time required to switch from idle mode into active mode.

The invention achieves at least one of its objects since the proposed energy management technique takes into account the fact that eye-tracking algorithms generally contain recursive filtering (e.g., Kalman filtering), wherein the accuracy is improved gradually with the number of iterations, or are dependent on previous measurements, intermediate data or partially processed data to be used as initial guesses for subsequent tracking. An eye-tracking algorithm of this type does not provide accurate and complete measurement data from the moment it is cold-started, but only after a wake-up time period has elapsed. Hence, in the prior art, the requirements of low energy consumption and responsiveness (low user latency) are clearly conflicting. The invention alleviates this difficulty by proposing a ready mode, in which the eye-tracking equipment operates at lower but non-zero power, so that a portion of the previous measurements, intermediate data or partially processed data remain updated and available to support and facilitate subsequent measurements when the equipment switches back into its active mode.

The active, ready and idle mode may differ regarding the state of (components of) the imaging device only, but may also differ with respect to operational parameters of other components in the personal computer system. For instance, the fact that the imaging device enters its off mode may trigger turn-off of a backlight in the visual display.

The imaging device may consist of a camera only, preferably a digital camera, but may also include further components, such as a light source for assisting the camera, e.g., by emitting non-visible light pulses preferably in the infrared or near-infrared range. Within the imaging device, therefore, either the camera only, the light source only or a combination of these and possible further components may behave differently in the active, ready and idle mode, respectively. As used herein, the term imaging device is not restricted to optical cameras, but is also intended to cover acoustic (e.g., ultrasound), electromagnetic (e.g., radar) sensors. The term also extends beyond those sensors which produce images that are perceived as such by a human viewer, thereby covering sensors formed as arrangements of a single-digit number of pixels, sensors including highly distorting pre-lenses intended to favour optical accuracy in regions of interest over other regions etc. Furthermore, the imaging device may be directed towards one or more of the viewer's eyes only but may as well image a larger portion of the face so as to determine a relative head pose, and the gaze may be determined based on the position of at least one eye in the face.

The active and ready modes may differ with regard to the data the imaging device provides. In the active mode, both eye position and eye orientation may be provided (To make this statement precise, the imaging device may output processed data representing eye position and eye orientation or, if it lacks appropriate processing capabilities of its own, the imaging device may output sufficient raw image data that a processor is able to determine eye position and eye orientation. The receiver of the output data may be a processor responsible for executing a graphical user interface forming part of application software, a desktop environment or the like). In the ready mode, however, either of these may be omitted to save resources, preferably eye orientation so that only eye position is provided. The eye position tracking may proceed throughout the ready mode, though preferably at a lower frame rate than in the active mode, so that up-to-date information on the eye position is readily at hand at the moment the imaging device switches back into active mode. This reduces the wake-up time significantly, while the energy consumption in ready mode may be limited significantly.

Alternatively, the active and ready modes may differ with respect to the number of distinct tracked eye features (e.g., pupil location, corneal reflections) on which the imaging device bases the eye-tracking data. In active mode, the eye tracking may be based on two or more features. For example, the eye-tracking processing may be based on reflections of no less than two distinct light sources (including the case where the reflections are captured within different camera frames), whereas in ready mode, the eye tracking may be based on a single distinct reflection, such as may be obtained using one single light source (including the case where a reflection of this light source is imaged at multiple points in time within different frames), that is, the eye-tracking processing is able to complete based on data from a single reflection. It is recalled that gaze tracking according to the pupil-centre-corneal-reflection (PCCR) approach requires as input the locations of a pupil and a corneal reflection that are simultaneous or near-simultaneous (see, e.g., the paper *General Theory of Remote Gaze Estimation Using the Pupil Center and Corneal Reflections* by E. D. Guestrin and M. Eizenmann, *IEEE Transactions on Biomedical Engineering*, vol. 53, no. 6, pp. 1124-1133 (June 2006), included herein by reference). The camera-to-eye distance may be a further input data source in PCCR gaze tracking. It is described in U.S. Pat. No. 7,572,008 how this distance can be estimated on the basis of two distinct corneal reflections. Accordingly, the eye tracker may refrain from updating the latest estimate of the camera-to-eye distance when in the ready mode but may do so intermittently in the active mode.

Further advantageous examples indicating how the active and ready modes can be configured in detail are noted in Table 1.

TABLE 1

Mode configurations

| Active mode | Ready mode |
|---|---|
| The imaging device tracks a pupil location and at least one corneal reflection. | The imaging device tracks a pupil location. |
| The imaging device applies active illumination, which enables tracking of a corneal reflection. | The imaging device does not apply active illumination. |
| One light source and one camera are active. | Two light sources and one camera are active. |
| One light source and one camera are active. | One light source and two cameras are active. |
| One camera is active. | One light source and one camera are active. |
| The imaging device operates at full resolution. | The resolution of the imaging device is reduced by binning pixel groups, e.g., by 2 × 2 (ratio 4:1), 4 × 4 (ratio 16:1), 1 × 2 (ratio 2:1), 2 × 1 (ratio 2:1), wherein multiple pixels are read out as one. Preferably, since binning increases the sensitivity of the imaging device, an associated light source is operated at lower intensity or is turned off completely. Additionally, the exposure time of the imaging device may be increased, thereby further increasing sensitivity at the cost of some accuracy. |
| The imaging device operates at a relatively lower binning ratio, e.g., 2:1. | The imaging device operates at a relatively higher binning ratio, e.g., 16:1. |
| The imaging device measures or estimates an eye position in world coordinates (e.g., n-dimensional coordinates or 3-dimensional coordinates). | The imaging device measures or estimates an eye position in image-plane coordinates (e.g., (n-1)-dimensional coordinates or 2-dimensional coordinates). |

It is pointed out that the scope of the invention includes combinations of the above pairs as well. Likewise, binning may refer to analogue binning, such as by reading out pixel charges in a group-wise fashion, so that luminous energy received at a plurality of pixels contribute to one value. It may also refer to digital binning in the sensor, which may form part of a pre-processing step involving adding or combining read-out data pixel values in processing hardware.

Moreover, in a system where plural cameras and/or plural light sources are provided, the ready mode may involve using a smaller number of these devices. Since estimations based on a smaller data set may have greater statistical variance, this mode may lead to slower and less accurate eye tracking data but may still provide sufficient information to significantly shorten the time for switching into active mode and collecting relevant eye-tracking data in comparison with a cold start from idle mode.

The input means in the personal computer system may consist of a dedicated input means on the one hand and general-purpose input means on the other. It may also consist only of either of these, as mentioned in the next paragraph. The dedicated input means are used to input eye-tracking control data only, whereas the general input means accept all other input data than eye-tracking data, that is eye-tracking control data and other input data. Because the dedicated input means is used only for eye-tracking control data, the operating system may allocate to it abilities to activate the eye tracker with lower delay than the general-purpose input means would achieve. The dedicated input means may be configured as a camera for detecting predefined face gestures, predefined body gestures or a microphone for detecting a predefined voice pattern. Advantageously, the camera used for this purpose is identical to the at least one imaging device that supplies the eye-tracking data. The dedicated input means may further be embodied as a hardware or software button, an IR sensor, a motion sensor, a proximity sensor, a touch-sensitive layer of a visual display or a portion thereof. In the latter case, one touch-sensitive display may comprise both an area acting as a dedicated input means and an area acting as a general-purpose input means.

Said eye-tracking control data entered via the dedicated input means may be an activation click, that is, a mouse-click-type signal supplementing a gaze point on the visual display to achieve a similar interface as that offered by a conventional pointing device, although this need not be organized on the basis of the pointer location as such conventional systems generally are. A completely hands-free HMI, in which all input data are entered either in the form of eye-tracking data or eye-tracking control data, is envisioned. Additional input means in such hands-free HMI may include acoustic, haptic or optic transducers and the like but is devoid of devices adapted to be mechanically manipulated using fingers, hands or other body parts.

Said eye-tracking control data may also be used to switch the eye-tracking functionalities between an enabled state and a disabled state, which may be particularly attractive for users conscious about personal integrity. As one possible option, the dedicated control means may be configured to force the imaging device into idle mode.

Alternatively, the dedicated input means may trigger an interrupt by which the imaging device is forced into active mode. The triggering may be achieved by functionally connecting the dedicated input means to an interrupt means (e.g., an interrupt pin) provided on the imaging device or on a processor associated therewith. Preferably, the dedicated input means is functionally disconnected from the interrupt means in the active mode, so as not to perturb the work of the imaging device during active mode, wherein the computational load is relatively higher than in other modes. By using an interrupt in this manner, the total latency associated with a switching into the active mode is reduced in comparison with the case of triggering the switching by means of the general-purpose input means, which typically have an inherent latency. Most of today's low-grade and middle-grade keyboards, mice, touch screens and other general-purpose I/O devices, of the type which a user may be expected to connect to a personal computer system in their possession, operate by line scanning followed by interrupt generation. Such an interrupt is generated indirectly, not by the user's actuation but by the scanning result. This principle of operation incurs a delay, which is typically negligible in the intended use of the I/O device (e.g., typing) and therefore rarely improved on by the manufacturer, but which makes a general-purpose I/O device poorly fit to input eye-tracking control data. Indeed, the latency contributed by the I/O device adds to the wake-up time of the imaging device itself, so that the total latency may become larger than is acceptable in a given application. This embodiment of the invention resolves the problem by triggering an interrupt directly.

In a further embodiment, the imaging device is powered separately, such as via an autonomously controllable electric switch connecting it to a drive power necessary for its operation. With this setup, the idle mode may consist in a complete power-off state of the imaging device. Hence, advantageously, the dedicated input means forces the imaging device into idle mode by disconnecting it from said drive power.

The active, ready and idle mode may differ with respect to an operating frequency of the imaging device. Generally, the operating frequency may refer to any frequency characterising a component within the imaging device, to the extent that the frequency influences the momentary power consumption. In particular, the operating frequency may be the sampling frequency (or frame rate) of a camera within the imaging means. It may also refer to a light-pulse frequency of a pulsed light source used in connection with a camera of this type, wherein each light pulse is synchronized with a sampling instant of the camera. In particular, the active and the ready mode may differ in terms of the operating frequency, wherein the ready mode is associated with a lower, non-zero frequency which maintains eye-tracking at a less accurate level. Such a less accurate level is yet configured with the aim of promoting fast switching from the ready mode into the active mode.

As a further option, which is particularly advantageous in connection with an eye tracker that utilizes active illumination, the operation of the imaging device in ready mode may include reducing an illumination intensity of the light source from the value it has in active mode. The illumination may even be dispensed with altogether, by turning the light source off, wherein the camera may optionally operate with longer exposure duration and/or pixel binning, so that the imaging device still provides output data although at a relatively lower quality. While the illumination is turned off, the duties normally fulfilled by the camera may alternatively be carried out by a camera for non-visible light, such as a camera sensitive to infrared radiation in or around the wavelength range corresponding to human body temperature.

The personal computer system may include a viewer presence detector, which is adapted to produce a positive and/or a negative detection signal causing the imaging device to transfer between modes accordingly. The presence detector may be a proximity detector or motion detector operating on the basis of, e.g., optic, acoustic, electromagnetic or capacitive measurements. It is noted that the presence detection may relate either to proximity of a viewer's eye to the imaging device or to proximity of the viewer's face, head or body to the imaging device or the personal computer system.

It is particularly advantageous to embody the viewer presence detector as a sensor arranged to detect proximity of a viewer's finger (or hand) to a button, scroll wheel or other hardware that is typically used for inputting data during a work session. The proximity sensor may for example be mounted in a push button acting as a dedicated input means in the sense above, notably for entering activation clicks with reference to a visible item appearing at the gaze position on a display. Such an activation click may cause activation of the item in the same manner as a conventional mouse click does. When the viewer has been detected in the above manner as being present, it is ensured that the imaging device enters ready mode, so that a switching to active mode, in case work is resumed, can be performed in very short time. The switching time may be further reduced if this embodiment is used in conjunction with other features of this invention, such as by using a direct interrupt to carry out this mode switching.

Alternatively or additionally, the personal computer may include an identifying means for determining the identity of a current viewer. The identification may be carried out with reference to a set of predefined personal profiles, wherein each is associated with personalized active modes including, e.g., values of parameters relevant to eye-tracking and/or energy management. Parameters relevant to eye-tracking may include eye-tracking calibration settings such as:

any viewer-dependent settings necessary for executing an eye-tracking algorithm or more particularly a gaze-tracking algorithm within the PCCR approach (see above), such as curvature and size of the cornea, position of the fovea, measured bright-pupil response and the like;

pre-stored calibration results, e.g., from a preliminary training session where the viewer is requested to gaze at predetermined display locations; and information indicative of the appearance of the eye area of the viewer, such as sclera colour, iris colour, complexion, presence of coloured eyeglasses and the like.

Parameters relevant to energy management may include settings indicating the typical length of a work session, a delay to be applied before a power-saving mode is entered, a desired image resolution or sampling frequency. The values may be pre-set by the viewer or by a system administrator with reference to an existing person. Alternatively, they may be generic in nature and pre-stored by a system designer to suit different categories of users.

As a further development of the preceding embodiment, the identifying means is an imaging device which is capable of sensing a viewer's (or in particular, an identified viewer's) actual viewing condition. Preferably, the actual viewing condition is partially based on visual data or entirely based on visual data. By an actual viewing condition is understood the presence of viewing aids, such as eyeglasses or contact lenses, or the wearing of certain garments, such as a cap or a veil, which information may improve or render more economical the acquiring and/or computational processing of eye-tracking data. A key to detecting the presence of contact lenses is to record occasions when a corneal reflection (glint) slips out into the sclera due to an oblique gaze angle; the average gaze angle at which the reflection leaves the cornea may be expected to be smaller for an eye wearing a contact lens than for a naked eye. Such adaptations may include modifying eye illumination, controlling optical filtering or compensating reflections and/or geometrical deformations produced by refractive elements in proximity of the eye. As an example of a potential energy saving made possible by knowing the actual viewing condition, the imaging device may be operated at lower resolution and/or without active illumination if the viewer's eye region in the actual viewing condition is known to provide good contrast in itself. The adaptations may advantageously be encoded as one or more sub-profiles associated with the personalized profiles discussed above. For instance, the active mode of the imaging device may be differentiated into active modes for persons A, B, C, etc., wherein the active modes for person A may be further subdivided into sub-profiles "person A without eyeglasses", "person A wearing clear eyeglasses" and "person A wearing sunglasses". In particular, one or more sub-profile modes may comprise settings to be applied in a pre-processing step compensating geometric deformations resulting from a refractive viewing aid, wherein different sub-profiles may differ with respect to the values of these settings. The pre-processing step may be carried out by the imaging device or an eye-tracking processor elsewhere in the personal computer system which is responsible for deriving eye-tracking output data on the basis of the data provided by the imaging device.

It is noted that the sub-profiles modes need not be hierarchically defined, as 'children' of a personalized sub-mode, but may also be represented as modes in their own right. In this situation, it may be suitable to encode in the data structures the fact that groups of modes are related insofar as they belong to a particular viewer, so as to facilitate the subsequent task of switching between the modes. Indeed, this reflects the fact that switching between sub-profiles is typically more frequent than switching between persons.

In a second and third aspect, the invention provides a method for operating a personal computer system including eye-tracking functionalities as well as a computer program product for performing the method by means of a programmable processor communicatively connected to—or constituting said personal computer system. The above features which have been outlined within the first aspect readily carry over to the second and third aspect, in which they may be used to advantage.

In one embodiment, a personal computer system comprises the following features:

a visual display;

an imaging device adapted to provide eye-tracking data by imaging at least one eye of a viewer of the visual display;

identifying means for recognizing the viewer with reference to one of a plurality of predefined personal profiles; and an eye-tracking processor for processing the eye-tracking data provided by the imaging device into processed eye-tracking data. According to this embodiment, the eye-tracking processor is selectively operable in one of a plurality of personalized active sub-modes associated with said personal profiles.

In this embodiment, the identifying means may apply any per se known biometric identification technique, such as fingerprint recognition, iris recognition or face recognition. It may as well utilize eye-tracking specific data, such as eye-blinking pattern, gaze pattern, fixation pattern, saccade pattern, eye geometry, average gaze calibration error and the like. In particular, the identifying means may comprise an imaging device configured to identify a viewer's iris and/or facial features. In the interest of simplifying the computer system structurally, the identifying means may use the imaging device responsible for eye tracking for the identification; this is advantageous, as the imaging device is in general not engaged in eye tracking before the viewer has been identified. Alternatively, the identifying means may be neither eye-tracking specific nor biometric, but may identify the user by means of a password, activation code or some other kind of security token.

In this embodiment, further, the eye-tracking processor may be integrated in the imaging device, preferably as a dedicated device, which is advantageous in cases where the eye-tracking capability is provided as an embedded system. Alternatively, the eye-tracking processor may coincide with a processor elsewhere in the personal computer system, which processor may have other responsibilities in addition to processing eye-tracking data. In particular, the eye-tracking processing may run as one of several parallel processes in an operating system executing on the processor. Independently of the location and the level of specialization or autonomy of the eye-tracking processor, the processing algorithms to be performed may include a mode-specific post-processing step, in particular a step including personal calibration data used to calculate the gaze position of the identified person.

The above embodiment is advantageous, especially in view of some of the objects of the invention in that it may reduce the time required to switch between users and/or the time required for the eye tracker to readapt when one user adjusts his or her way of interacting with the eye tracker during a work session.

In a further development of this embodiment, a second identifying means may sense a viewer's actual viewing condition, as outlined above.

Based on the actual viewing condition thus determined, the eye-tracking processor is operated in a sub-profile mode associated with this. For instance, one or more sub-profile modes may be defined for each personalized active sub-mode. The second identifying means used for sensing an actual viewing condition may be distinct from the identifying means used for recognizing a viewer. This way, the hardware can be optimized in view of the respective tasks and time multiplexing can be avoided. Alternatively, the identifying means and the second identifying means may coincide. This has the advantage of reducing the number of parts and possibly reducing the bulkiness or cost of the eye-tracking equipment. As noted above, it is possible to perform both the viewer recognition and the eye-tracking tasks in one imaging device, and consequently this device may in some embodiments fulfil a three-fold purpose, namely to perform viewer recognition, eye tracking and sensing of an actual viewing condition.

Results produced by the identification means and/or the second identification means may be updated during operation. This applies both to results of recognizing a viewer and, if such are available, to results of sensing an actual viewing condition. The updating may amount to repeating the operation on which the original result was based. If a current personalized sub-mode is not the one associated with the best matching personal profile, or a current sub-profile is not the one associated with the actual viewing condition, it is concluded that the updated result is different. The eye-tracking processor then begins operation in a mode (that is, a personalized sub-mode or a sub-profile thereof, as the case may be) associated with the updated result. Advantageously, an attempt to re-sense the actual viewing condition is made relatively more frequently than an attempt to recognize the viewer. As one example, a temporary absence of tracked eyes may be interpreted either as an eye blinking by a current viewer or a change of viewer altogether; according to the invention, the primary option is to ascertain whether there has been a change in actual viewing condition and the secondary option is to re-identify the viewer. In particular, the updating of the actual viewing condition may proceed continuously.

As a further development of the above embodiments, the personal computer system may execute a graphical user interface (GUI) including visible items appearing on the display. This provides for a further way of verifying that the correct mode (i.e., personalized sub-mode or sub-profile) is being used, namely, by comparing the viewer's gaze-point location with the actual location of a visible item in the GUI at a point in time when the viewer is deemed to gaze at this feature, from which a gaze-point deviation can be derived. An advantageous point in time for thus measuring the gaze-point deviation is during an activation click entered by means of a dedicated input means, as described above, by which action the viewer inputs data using the GUI. Equivalently, the point in time at which the viewer activates a visible GUI item by gazing at it for a prolonged duration may be used. In the case of an extended visible item, such as a button on a GUI adapted for click actuation, the deviation may for instance be measured with reference to a centre or centroid of the item. The identifying means may receive information indicating the visible item locations directly from the processor or indirectly, via the visual display, if the display post-processes the processor output necessary to determine the final locations of the items.

As a variation hereto, a personal profile or an actual viewing condition may include data indicating a historic average deviation (or some other statistical measure of the total deviation), which may then be used as an expected calibration error being one of the properties to aid in recognizing a known user of the eye-tracking enabled system. By comparing the current average gaze-point deviation during a work session, it may be verified or falsified that the eye-tracking processor is operating in the most suitable mode. As an alternative, the identifying means may be adapted to select the mode which currently provides the smallest average gaze-point deviation. Alternatively, the occurrence of a large deviation detected in the gaze data, which indicates that the current profile is not optimal, can trigger another means for identifying the person.

In a further development of the above embodiment, the personal computer system further includes a mode-transition indicator. The mode-transition indicator notifies the viewer that the eye-tracking processor is about to begin or has begun operation in a freshly selected mode, that is, a freshly selected (notably updated) personalized sub-mode or a sub-profile. This provides the viewer or the new viewer, respectively, with feedback to the effect that the system has adapted to a detected change of person or a change of actual viewing condition. The notification may be visual, such as by changing a symbol appearing on the visual display. For instance, the appearance of an icon may change. As another example, if the new mode is a sub-profile, an avatar representing the viewer may mimic the change in actual viewing condition by beginning to wear (not wear) eyeglasses, a cap etc. Furthermore, the notification may be non-visual, preferably acoustic or tactile, so as not to obscure other items on the visual display. In particular, when a known user X begins a new work session, a natural-language message along the lines of "Welcome X!" or "Welcome X! I see you're wearing sunglasses." may be read aloud.

In a particular embodiment, the viewer is recognized by way of face identification. To facilitate this, the identifying means is an imaging device with an active illumination capability, so that a face to be recognized can be illuminated in a suitable manner regardless of the ambient lighting conditions. Such suitable illumination may be substantially uniform and may attempt to avoid abrupt local illumination gradients, e.g., sharp shadows. This typically makes the face recognition faster and more accurate. The active illumination may use visible or non-visible light. Advantageously, the active illumination is performed by an illuminator that is otherwise adapted to provide a pupil reflex required for PCCR gaze tracking. This reduces the complexity of the eye-tracking equipment.

It is noted that the invention relates to all combinations of features, even if they are recited in mutually different claims.

BRIEF DESCRIPTION OF DRAWINGS

By way of example and not limitation, embodiments of the invention will now be described with reference to the accompanying drawings, on which.

All the figures are schematic and generally only show parts which are necessary in order to elucidate the invention, whereas other parts may be omitted or merely suggested.

BRIEF DESCRIPTION OF EMBODIMENTS

Figure 1:
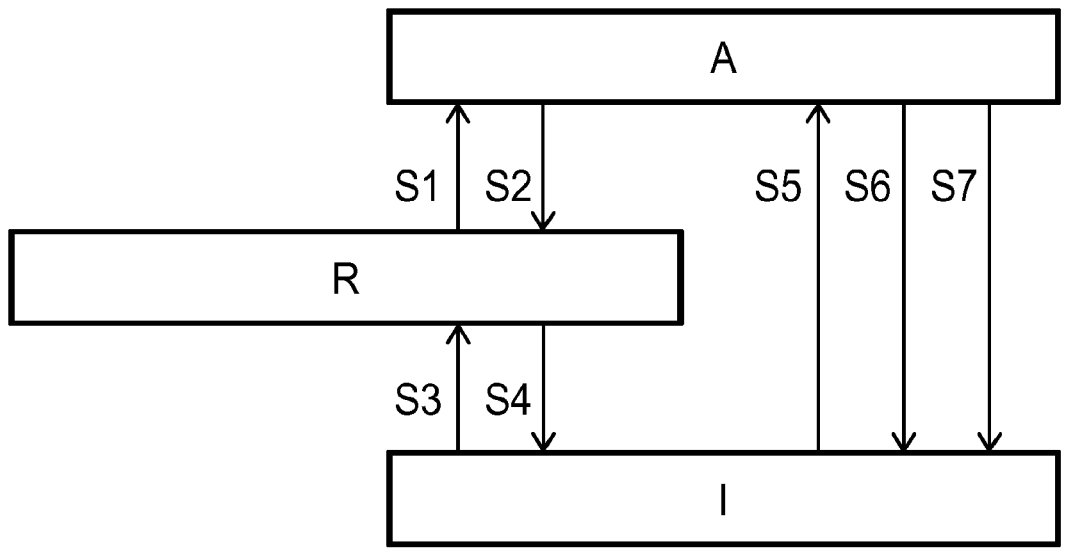
FIG. 1 illustrates an active, ready and idle mode of an eye-tracking equipment and transitions between these.

FIG. 1 schematically shows an active mode A, a ready mode R and an idle mode I of a imaging device in an eye tracker. As outlined above, the eye tracker performs computations of a recursive nature or uses historic data, so that, on the one hand, a given computing or measuring task may be facilitated or expedited by results or intermediate results from previous computations and measurements and, on the other hand, the eye tracker has considerable wake-up time before it provides accurate and complete output data. No result history is maintained in the idle mode, whereas a full result history allowing the eye tracker to take full advantage of the previous computations and measurements—is maintained in the active mode. The full result history may refer to a moving time window of values, whereby the least recent values are discarded as new ones are entered. The ready mode is characterized by producing and maintaining a partial result history (e.g., lower sample rate, fewer samples or samples acquired at lower resolution or lower accuracy), representing a trade-off between low energy consumption and high responsiveness (quantified as, e.g., a short wake-up time). Likewise, in implementations where various hardware components are associated with a warm-up or initialization time until the component is in a fully operational state, the ready mode may correspond to a partially operational mode, wherein not all components operate at full power and/or some components are completely disabled. Preferably, the disabled components are those which contribute most significantly to the total power consumption and/or have the shortest initialization time.

Figure 3:
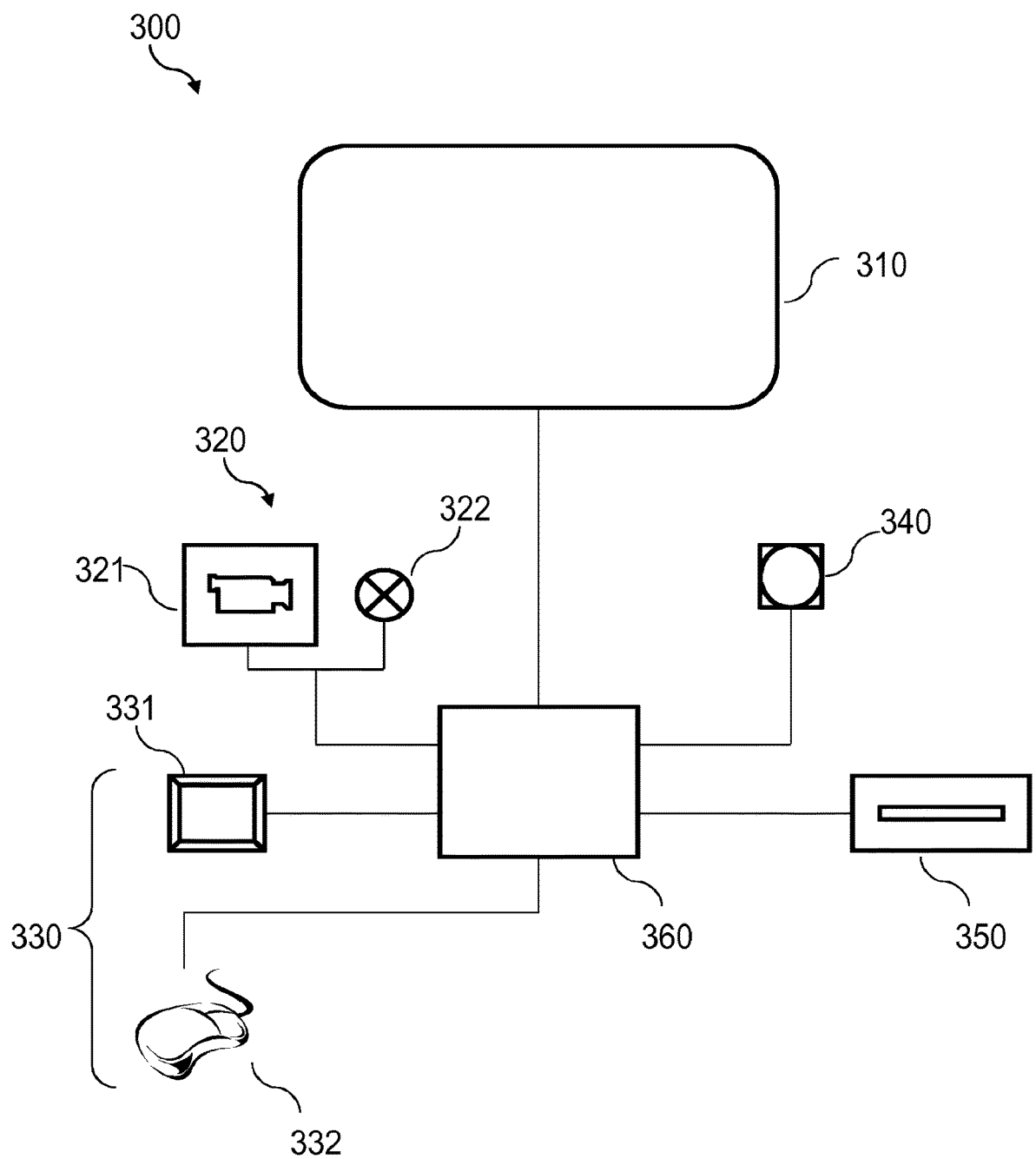
FIG. 3 is a generalized block diagram of a personal computer system in accordance with an embodiment of the invention.

FIG. 3 shows a personal computer system 300, which includes a visual display 310 for displaying output data. The visual display 310 may produce an image acting as a reference for gaze-point detection in a HMI including gaze-based communication; in this case, the gaze point may be determined by intersecting the detected optic axis of an eye with the image plane of the display 310 and correcting for the off-axis position of the fovea in the retina using per se known techniques for this. The personal computer system 300 further comprises an imaging device 320, which in this embodiment comprises one camera 321 and one pulsed light source 322 synchronized with the camera 321. Depending on the intended use conditions, alternative embodiment the imaging device 320 may include more than one camera and more than one light source, but may as well lack a light source altogether. The momentary power of both the camera and the light source varies with operational parameters such as the sampling and illumination pulse frequency, the intensity and solid angle of illumination, the image resolution and image size, so that a power-saving mode, in particular a ready mode or idle mode, may be achieved by modifying one or more of these parameters. The display 310 and the imaging device 320 may be separate free-standing devices as shown on the drawing, or may form one multi-purpose unit. Alternatively, either or both may be embodied as head-mounted devices; this is particularly advantageous in connection with a hands-free HMI of the type outlined above.

The personal computer system 300 further comprises input means 330 including a dedicated input means 331 (symbolically shown as an "off" button) 5 for entering eye-tracking control data and a general-purpose input means 332 (symbolically shown as a mouse). Further, the system 300 includes a presence sensor 340 (shown as an optical sensor) for sensing the presence of a viewer or, possibly, a viewer's eye, as well as an identifying means 350, such as a biometric sensor (shown as a line scanner for fingerprints). In the figure, 10 the peripherals discussed so far are shown connected to a central unit 360, possibly including a processor (not shown), and may be embodied as physically separate components or as integral parts of the central unit 360. In this embodiment, the imaging device 320 supplies its output data to the central unit 360, which is responsible for executing a program (e.g., a desktop environment or application software) providing a user interface with which the user interacts. In portable computers and smart phones, the peripherals are commonly embodied within a common housing.

The configuration that FIG. 3 illustrates relates to a solution with a relatively low degree of hardware integration. A possible alternative hereto may be obtained by utilizing the camera 321 as a presence sensor, so that no dedicated component is required to detect user presence. This may be achieved with negligible inconvenience, since presence detection is most relevant in the idle or ready mode, when the camera 321 is typically operated at reduced frame rate and/or resolution. Also, the identifying means 350 may be integrated in the imaging device 320, e.g., in the form of face-recognition or iris-recognition identifying means. If the imaging device 320 includes a light source 322, it is advantageous to carry out the identification on the basis of face recognition, as this process may be rendered more accurate by uniform illumination provided by the light source 322 rather than relying on ambient light conditions.

Further, the viewer presence detector may be embodied as a proximity sensor arranged in a touch input device, such as the mouse 332 or the button 331 in FIG. 3. This makes it possible to predict input of new data and put the eye tracker 320 in ready mode so as to let the delay, which is associated with this mode change, elapse at an earlier point than after the first input data arrive.

It will be appreciated that further integration of several functions into one hardware unit is possible, as is distribution of one functionality over several collaborating hardware units.

As shown in FIG. 1, transitions from any mode to any other mode are enabled. In this embodiment, the mode transitions are triggered by signals provided by the presence sensor 340, a "off" button 331 for entering eye tracking control data (forcing of the eye-tracking equipment into idle mode) and general-purpose input means 332 for entering input data other than eye-tracking data and eye-tracking control data. The switching between modes may proceed as indicated in Table 2.

TABLE 2

Mode transitions

| | From/To | Trigger condition |
|---|---|---|
| S1 | R→A | The general-purpose input means 332 receive data. |
| S2 | A→R | The general-purpose input means 332 have not been used for a first predetermined time interval. |
| S3 | I→R | The presence sensor 340 detects that a viewer is present. Alternative trigger: the imaging device 320 in low-power mode detects that a viewer is present and his or her approximate gaze direction is at the visual display (wake on gaze). The approximate detection may for instance be configured to detect two pupils that are seen in a direction close to the frontal direction, that is, wherein the pupils are moderately elliptic and do not differ above a given threshold from a circular shape. |
| S4 | R→I | The presence sensor 340 detects that no viewer is present. Alternative trigger: the presence sensor 340 has not detected presence of a viewer for a second predetermined time interval. |
| S5 | I→A | The general-purpose input means 332 receive data. Alternative trigger: wake on gaze, as detailed above, optionally supplemented by requiring that a dedicated input means receive data. |

TABLE 2-continued

Mode transitions

| From/To | | Trigger condition |
|---|---|---|
| S6 | A→1 | The presence sensor 340 detects that no viewer is present; alternatively, the presence sensor 340 has not detected presence of a viewer for a second predetermined time interval. |
| S7 | A→1 | The "off" button 331 is activated. |

This embodiment achieves an object of the invention since transition S1, the resulting wake-up time of the system, requires less time than transition S5.

The exemplifying embodiment shown in FIG. 3 lacks a positive dedicated input means. It will be appreciated that such positive dedicated input means may be readily included, for instance, as a hardware button for inputting eye-tracking control data. The eye-tracking control data may be input by depressing the hardware button. As explained earlier, the pressing functionality of the button may alternatively be reserved for input of other input data that are not related to eye tracking, wherein the eye-tracking control data are entered by a proximity sensor arranged within the button. Clearly, such positive dedicated input means may in some embodiments replace the "off" button 331 shown in FIG. 3.

Figure 2:
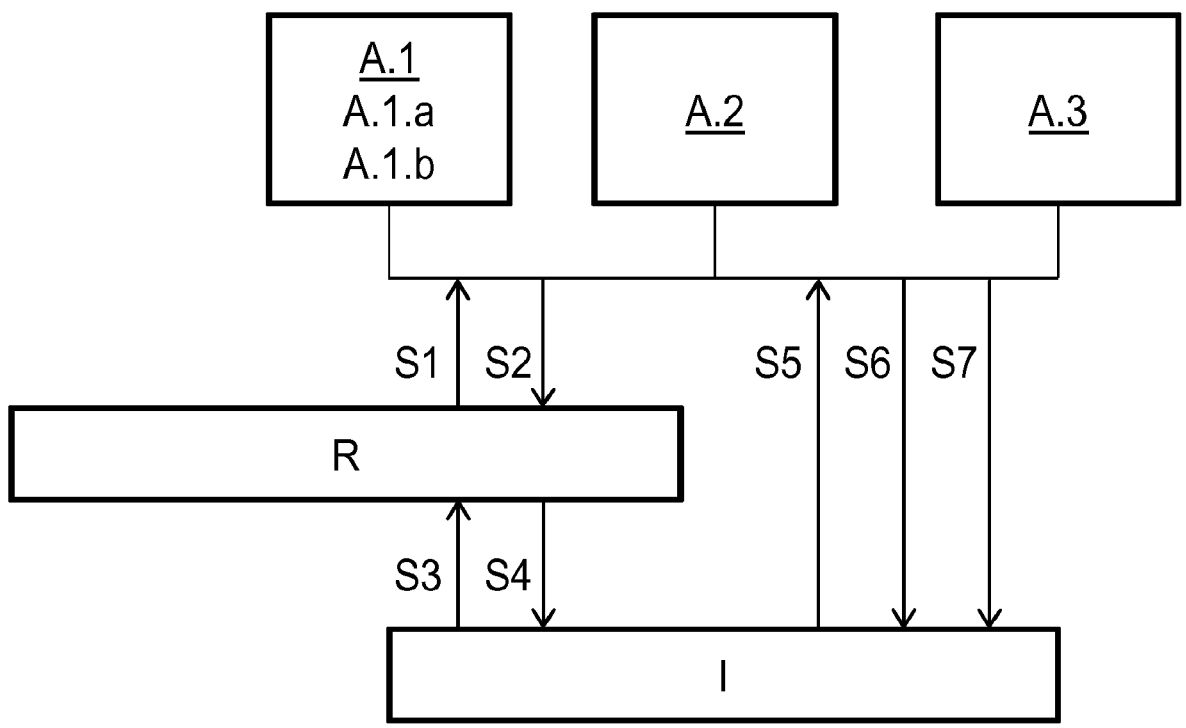
FIG. 2 illustrates a further development of the setup in FIG. 1, wherein the active mode is differentiated into personalised modes.

Turning to FIG. 2, it will now be discussed how the above setup can be further developed by differentiating the active mode A into a set of personalized active sub-modes A.1, A.2, A.3, each associated with a known viewer (i.e., with a personal profile). This embodiment includes an initial identification step, wherein the viewer is identified using the identifying means 350 and the result is cached for the duration of a work session. Each transition S1, S5 into the active mode A, whether from the ready mode R or the idle mode I, will then be replaced by a transition into the personalized sub-mode associated with the identified viewer, in accordance with the cached identification result. Similarly, each transition S2, S6, S7 from a personalized sub-mode into either the ready mode R or the idle mode I may be carried out substantially as if it happened from the active mode A.

Optionally, the sub-modes A.1, A.2, A.3 associated with the personal profiles may be further refined into sub-profile modes A.1.a, A.1.b reflecting different viewing conditions, e.g., wearing of eyeglasses, as described above. Each actual viewing condition can be observed optically. By using for instance the presence detector 340 or the camera 321, which thereby acts as second identifying means in the sense of the claims, the actual viewing condition may be continuously monitored for a change in sub-profile, allowing the settings in the active sub-mode to be adjusted accordingly.

Figure 4:
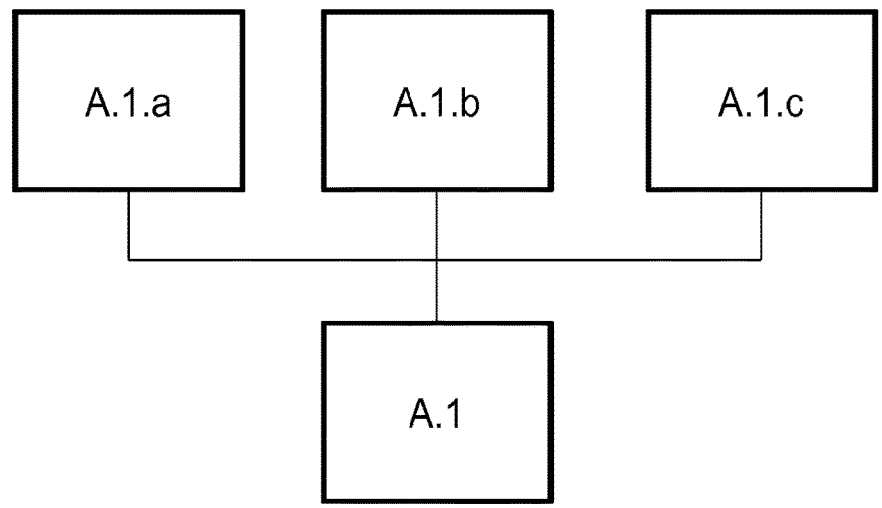
FIG. 4 illustrates a set of sub-profile modes of an eye-tracking processor in a personal computer system, which modes are subordinate to an active sub-mode of the same component.

FIG. 4 schematically shows a configuration of modes affecting an eye-tracking processor in an eye-tracking enabled personal computer system 300 of the general type shown in FIG. 3. An identifying means, which may be a fingerprint sensor 350 or a different component operable to verify a person's identity, identifies a user by matching user-related data to a predefined personal profile. In response to this, an eye-tracking processor (not shown) enters sub-mode A.1, which is associated with the predefined profile and contains, inter alia, settings modifying a calibration step to be applied as part of the processing of eye-tracking data provided by an imaging device 320 responsible for the eye tracking. In this mode A.1, the identifying means (acting as second identifying means) attempts to sense an actual viewing condition of the user by analyzing user-related data, preferably visual data acquired by the imaging device 320. When an actual viewing condition has been sensed, the eye-tracking processor enters one of the sub-profile modes A.1.a, A.1.b, A.1.c enabled by this configuration, namely the sub-profile mode associated with the sensed actual viewing condition. Preferably, the identifying means is adapted to update (re-sense) an actual viewing condition at regular time intervals or when triggered by predefined events. Then, if the updated condition differs from the current one, the eye-tracking processor enters a different sub-profile mode. It is noted that the eye-tracking processor, which is not shown explicitly in FIG. 3, may be located either in an imaging device 320 (e.g., as an embedded processor) or in a main (e.g., CPU) or auxiliary (e.g., graphical) processor 360 of the personal computer system 300.

Figure 5:
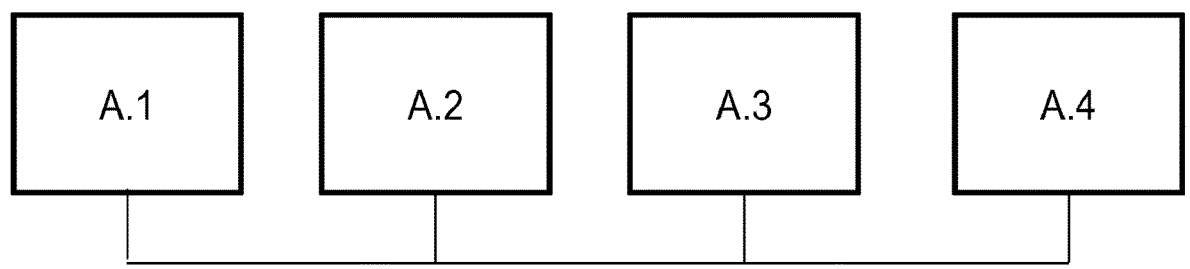
FIG. 5 illustrates a set of active sub-modes of an eye-tracking processor in a personal computer system.

FIG. 4 and FIG. 5 illustrate mode configurations applicable in a similar eye-tracking enabled personal computer system 300 as the one referred to in the previous paragraph. Only one personal profile was defined in the mode configuration of FIG. 4, so that the ability to recognize a user was no essential feature of the identifying means. By contrast, FIG. 5 illustrates a mode configuration in which there is only one sub-profile mode for each personalized active sub-mode. In practice, this implies that the identifying means utilized for implementing the mode configuration according to FIG. 5 need not be able to sense an actual viewing condition. In other words, this functionality is not an essential feature of the present invention. Similarly as in FIG. 4, the identifying means carrying out the mode configuration illustrated in FIG. 5 may be adapted to determine, after initially recognizing the user, whether the recognized user is still present or if he or she has been replaced by a different user.

The algorithms illustrated by FIGS. 1, 2, 4 and 5 may be embodied as computer-executable instructions distributed and used in the form of a computer-program product including a computer-readable medium storing such instructions. By way of example, computer-readable media may comprise computer storage media and communication media. As is well known to a person skilled in the art, computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Further, it is known to the skilled person that communication media typically embodies computer readable instructions, data structures, program modules or other data in a modulated data signal such as a carrier wave or other transport mechanism and includes any information delivery media.

What is claimed is:

1. A system for indicating to a user a mode transition of an eye tracking arrangement, wherein the eye tracking arrangement has detected at least a first viewing condition and a second viewing condition, the system comprising:
   an eye tracking device using at least one corneal reflection of at least one eye of the user for determination of eye position, gaze point or gaze angle of the user;
   one or more processors configured to: operate the eye tracking device in a first mode associated with the first viewing condition of the user, the first viewing condition corresponding to one of the presence or absence of a viewing aid or garment worn by the user;
   detect, with the eye tracking device, a change to the second viewing condition of the user, the second viewing condition corresponding to the other of the presence or absence of the viewing aid or garment worn by the user;
   compare the second viewing condition to a plurality of predefined mode profiles to identify a match to a predefined mode profile;
   determine a transition from the first mode to the predefined mode profile, wherein the transition is personalized to the user;
   notify the user when the second viewing condition matches the predefined mode profile and operation of the eye tracking device transitions from the first mode to the predefined mode profile based on the transition.

2. The system of claim 1, wherein the plurality of predefined mode profiles comprise: a plurality of modes for each known user of the eye tracking device.

3. The system of claim 2, wherein the plurality of modes for each known user comprise: an active mode, a ready mode, and an idle mode.

4. The system of claim 3, wherein at least one of the active mode, the ready mode, and the idle mode comprises: a sub-profile related to a person wearing an accessory.

5. The system of claim 1, wherein notifying the user comprises: causing a visual notification to be presented on a display.

6. The system of claim 1, wherein notifying the user comprises: causing a change in appearance of a digital element on a display.

7. The system of claim 1, wherein notifying the user comprises: causing a tactile notification to be made to the user.

8. A method for indicating to a user a mode transition of an eye tracking arrangement, wherein the eye tracking arrangement has detected at least a first viewing condition and a second viewing condition, the method comprising:
   operating an eye tracking device that uses at least one corneal reflection of at least one eye of the user for determination of eye position, gaze position or gaze angle of the user, in a first mode associated with the first viewing condition of the user, the first viewing condition corresponding to one of the presence or absence of a viewing aid or garment worn by the user;
   detecting, with the eye tracking device, a change to the second viewing condition of the user, the second viewing condition corresponding to the other of the presence or absence of the viewing aid or garment worn by the user;
   comparing the second viewing condition to a plurality of predefined mode profiles to identify a match to a predefined mode profile;
   determine a transition from the first mode to the predefined mode profile, wherein the transition is personalized to the user;
   notifying the user when the second viewing condition matches the predefined mode profile and operation of the eye tracking device transitions from the first mode to the predefined mode profile based on the transition.

9. The method of claim 8, wherein notifying the user comprises: causing a visual depiction to be presented on a display, wherein the visual depiction comprises an avatar representing the user transitioning from the first viewing state to the second viewing state.

10. The method of claim 8, wherein notifying the user comprises: notifying the user prior to transitioning to the predefined mode profile associated with the second viewing state.

11. The method of claim 8, wherein detecting the change to a second viewing state comprises: identifying a new user with facial recognition.

12. The method of claim 8, wherein notifying the user comprises: producing a visual notification on a display.

13. The method of claim 8, wherein the plurality of predefined mode profiles comprise: an active mode wherein the eye tracking device is fully operable;
   an idle mode wherein the eye tracking device is in a first power-saving mode; and
   a ready mode wherein the eye tracking device functions in a second power-saving mode and wherein a wake-up time to transition to the active mode is shorter than a wake-up time to transition from the idle mode to the active mode.

14. The method of claim 8, wherein notifying the user comprises causing at least one of: a tactile notification; an audible notification; or a visual notification.

15. A non-transitory computer readable medium having instructions stored thereon executable by a computing device for indicating to a user a mode transition of an eye tracking arrangement, wherein the eye tracking arrangement has detected at least a first viewing condition and a second viewing condition and, wherein the instructions cause the computing device to perform operations comprising:
   operating an eye tracking device that uses at least one corneal reflection of at least one eye of the user for determination of eye position, gaze point or gaze angle of the user, in a first mode associated with the first viewing condition of the user, the first viewing condition corresponding to one of the presence or absence of a viewing aid or garment worn by the user;
   detecting, with the eye tracking device, a change to the second viewing condition, the second viewing condition corresponding to the other of the presence or absence of the viewing aid or garment worn by the user;
   comparing the second viewing condition to a plurality of predefined mode profiles to identify a match to a predefined mode profile;
   determine a transition from the first mode to the predefined mode profile, wherein the transition is personalized to the user;
   notifying the user when the second viewing condition matches the predefined mode profile and operation of the eye tracking device transitions from the first mode to the predefined mode profile based on the transition.

16. The non-transitory computer readable medium of claim 15, wherein detecting the change to the second viewing condition comprises:
   identifying a new user.

17. The non-transitory computer readable medium of claim 15, wherein notifying the user comprises: causing a tactile notification to be provided to the user.

18. The non-transitory computer readable medium of claim 15, wherein notifying the user comprises: causing an audible notification to be provided to the user.

19. The non-transitory computer readable medium of claim 15, wherein notifying the user comprises: causing a visual notification to be presented on a graphical user interface.

20. The system of claim 1, wherein the predefined mode profile comprises a plurality of sub-modes, and wherein the transition identifies one of the plurality of sub-modes based on a profile of the user.

* * * * *